United States Patent
Lin et al.

(10) Patent No.: US 7,190,356 B2
(45) Date of Patent: Mar. 13, 2007

(54) METHOD AND CONTROLLER FOR IDENTIFYING DOUBLE TAP GESTURES

(75) Inventors: Jao-Ching Lin, Hsin Chuang (TW);
Shyh-In Huang, Hsin Chuang (TW);
Lin-Abel Chu, Hsin Chuang (TW);
Chung-Yi Shen, Hsin Chuang (TW)

(73) Assignee: Sentelic Corporation, Taipei (TW)

( * ) Notice: Subject to any disclaimer, the term of this patent is extended or adjusted under 35 U.S.C. 154(b) by 554 days.

(21) Appl. No.: 10/776,976

(22) Filed: Feb. 12, 2004

(65) Prior Publication Data
US 2005/0179646 A1 Aug. 18, 2005

(51) Int. Cl.
*G09G 5/00* (2006.01)
(52) U.S. Cl. ....................... 345/173; 345/156
(58) Field of Classification Search ............... 345/156, 345/157, 173–177; 178/18.01–18.09
See application file for complete search history.

(56) References Cited

U.S. PATENT DOCUMENTS

| 5,880,411 | A | * | 3/1999 | Gillespie et al. ......... 178/18.01 |
| 5,956,019 | A | * | 9/1999 | Bang et al. .................. 345/173 |
| 6,856,259 | B1 | * | 2/2005 | Sharp ............................ 341/5 |
| 7,002,557 | B2 | * | 2/2006 | Iizuka et al. ................. 345/173 |
| 2002/0093491 | A1 | * | 7/2002 | Gillespie et al. ............ 345/173 |
| 2004/0178997 | A1 | * | 9/2004 | Gillespie et al. ............ 345/173 |

* cited by examiner

*Primary Examiner*—Ricardo Osorio

(57) ABSTRACT

A method of identifying double tap gesture, wherein the double tap gesture is produced on a touch device and characterize in that: when the summation of the first appearing time duration, the time span between the two appearing time durations and the second appearing time duration is smaller than the first reference time, then generate a first signal that represents the first and second appearances. This is to simulate the double tap signal output from the double clicking of the mouse button and so as to achieve a short, simple and reliable determination.

21 Claims, 4 Drawing Sheets

METHOD AND CONTROLLER FOR IDENTIFYING DOUBLE TAP GESTURES

BACKGROUND OF THE INVENTION

1. Field of the Invention

The present invention relates to a method and controller for identifying double tap gestures, especially referring to a method and controller for identifying double tap gestures on touch device. When the touch device identifies the double tap gesture, simulate a double tap signal that represent a series of consecutive double clicking of the mouse button (usually the default is the left button).

2. Brief Description of Related Art

Graphical User Interface, GUI, accompanying by the pointing device (such as a mouse) was the first program operation interface released by the PARC research group. The user can easily accomplish the executed action by just using the visual type of pointer through the movement and clicking of the mouse, this solves the inconvenience created by the input of complex instruction during the text mode. Therefore, GUI is commonly used by Apple computers and Microsoft and it becomes a mainstream interface of all the operating systems. In the electronic devices that utilize GUI, such as desktop computer, portable computer, tablets, personal digital assistant and so on, pointing device has become a basic accessory.

Currently, the pointing device includes external mouse, track-ball and touch pad built-in on the portable computers, the touch panel incorporated with the monitor and so on. The mouse is the pointing device that is released the earliest. Using the mouse as an example to illustrate the functionality of the pointing device, the mouse is able to control the pointer on the monitor screen, which means that the pointer will follow to anywhere the mouse moves to and when clicking of the control button is performed at the to be executed target on the monitor, then the instruction will be executed to the electronic device. However, the current trend of the electronic equipment is heading towards small and light, for example, the portable computers are gradually replacing the export of the desktop computers and this results the small-sized touch device (e.g. touch pad) to be slowly become the mainstream of pointing device.

Presently, the touch device technology includes capacitor type, resistive type, magnetic type, pressure type, inductance type, surface sonar type, supersonic type, and optical type and so on. When an object such as a finger moves on the touch device, it can control the pointer to move in the direction of the movement of the object. Moreover, the pointing device besides controlling the pointer, it also has the function to execute instruction. Using the mouse as an example, when the pointer moves over the target (e.g. program, document) to be started, double clicking the mouse button (default to be left button in most system) will select the target and opens it. However, for touch device such as touch pad, currently two control buttons have been installed below to replace the left and right buttons of the mouse or by defining certain gesture on the touch device to generate signal corresponding to the simulated double clicking.

Currently, the touch device opens the selected target by tapping the touch device consecutively twice gesture (known as double tap gesture in the following text), which replaces the double clicking action of the mouse. Thus, a conventional method of identifying double tap gesture is described in U.S. Pat. No. 6,414,671. Referring to FIG. 1 (corresponding to FIG. 15F in U.S. Pat. No. 6,414,671 specification), first of all, compare the first appearing time duration $t_{19}$ of the object on the touch device (refers to the time of stay of the object first appeared on the touch device) with the first reference time, if the first appearing time duration $t_{19}$ is smaller than the first reference time value, then produce a first signal 11; after that, if second appearance is not detected within the time of the second reference time, terminates the first signal, in other words, the time span between the two appearing time duration $t_{20}$ has to be smaller than the second reference time value; next, compare the second appearing time duration $t_{21}$ with the third reference time value, if the second appearing time duration $t_{21}$ is shorter than the third reference time value, then terminates the first signal and produce a second signal 12, therefore it can output two signals 11 and 12 to simulate the signal of double clicking of the mouse button.

Even though the conventional method can achieve the objective of identifying the double tap gesture, however in the conventional method, it makes the determination to be more complex by comparing the first appearing time duration $t_{19}$, time span between two appearing time duration $t_{20}$, and the second appearing time duration $t_{21}$ with the respective reference time values. Additionally, since the user differs from one another, therefore, when each person perform the double tap gesture on the touch device will have different length of time in each step of the action or even for the same user to perform the every double tap gesture on the touch device will vary in time for each action, thus resulting in the situation where a misinterpretation has occurred. Also, during the operation of the touch device, it can be easily touched by mistake, or due to the noise of the touch device itself, or interference by the noise from the surrounding environment will all produce short spike of the first and second appearance phenomenon. The conventional method does not have minimum time restriction on the first and second appearing time duration and the time span between the two appearing time durations; therefore, the interference signal produced due to noise will cause inappropriate determination and easily allow the situation of misinterpretation to happen. Moreover, as the tap and drag gesture also taps on the touch device twice where during the drag of the second tap, the conventional method did not take into the consideration of the accumulated displacement of the second appearing duration, it will easily cause the misinterpretation of the double tap gesture with the tap and drag gesture.

SUMMARY OF INVENTION

A main objective according to the present invention is to provide a method and controller for identifying double tap gesture, utilizing the comparison of the total time duration for each action with the first reference time value in order to achieve a faster and more reliable determination.

Another objective of the present invention is to provide a method and controller for identifying double tap gesture, wherein the time duration of each respective action has to be larger than the corresponding pair of reference values so as to effectively avoid the situation where a misinterpretation might occur due to noise signal.

A further objective of the present invention is to provide a method and controller for identifying double tap gesture, wherein the displacement detected during the second occurrence has to be smaller than the corresponding reference value so as to achieve an accurate determination.

The method of identifying double tap gesture according to the present invention, wherein the double tap gesture is performed on a touch pad and the method includes the following steps:

i. detecting the first occurrence of an object on the touch pad;

ii. detecting the second occurrence of the particular object on the touch pad; and iii a first signal representing the first and second appearance being immediately generated in case of the summation of the first appearing time duration, the second appearing time duration and the time span between the end of first appearing time duration and the start of the second appearing time duration is smaller than first reference time value.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

First and foremost, the method and controller for identifying double tap gesture according to the present invention is to be applied on a touch device. To simplify the explanation, a capacity type touch device will be selected for illustrating the preferred embodiment of the present invention.

Figure 1:
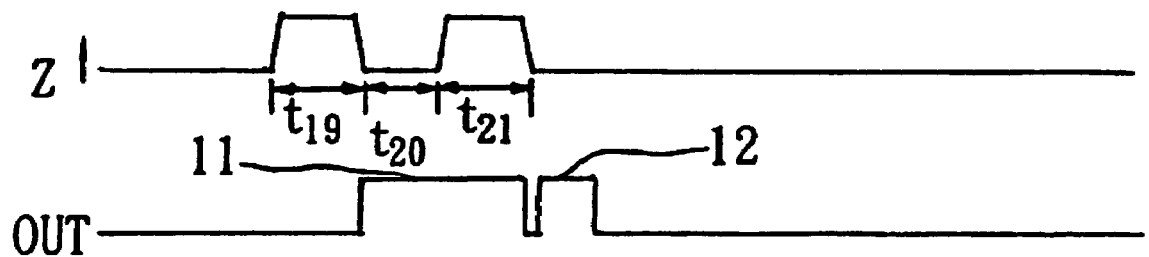
FIG. 1 is a diagram illustrating time pulse of conventional double tap gesture.
Figure 2:
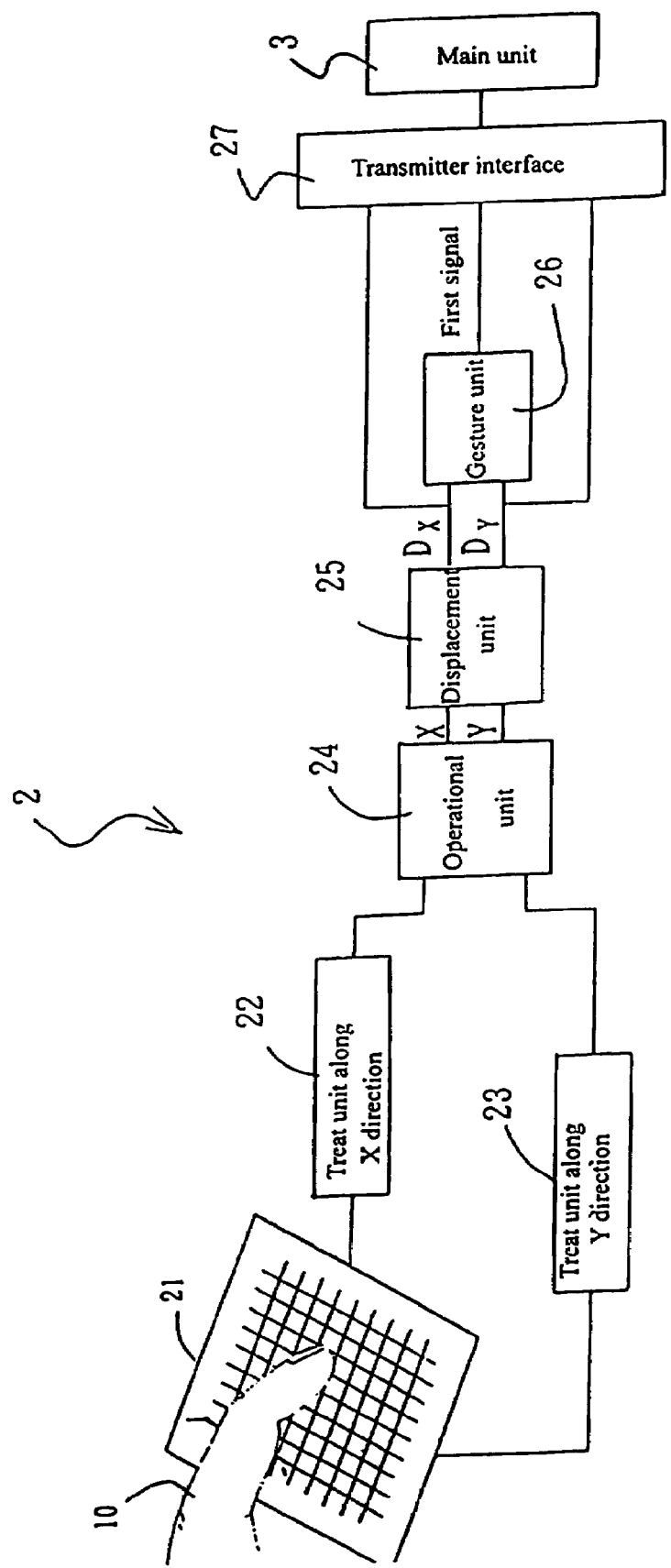
FIG. 2 is a block diagram illustrating touch device of a preferred embodiment in a method associated with the present invention for identifying double tap gesture.

Referring to FIG. 2, a capacity type touch device 2 includes at least one touch pad 21, one treat unit along X direction 22, one treat unit along Y direction 23, one operational unit 24, one displacement unit 25, one gesture unit 26 and a transmitter interface 27. The touch pad 21 has multiple wires distributed in the X and Y direction respectively, for example 16 wires in the X direction and 12 wires in the Y direction. Therefore, when a conductive object such as a finger 10 touches and in close contact with the touch pad 21, it will cause a change in the capacitance on the touch pad 21. The X and Y direction treat units will immediately process the respective capacitance on the X and Y direction and transmit the data to operational unit 24. The operational unit 24 based on the received data will compute the X and Y coordinates of the object contact location. After that, the displacement unit 25 will receive the X and Y coordinates computed by the operational unit 24 and based on this information calculate the relative displacement Dx and Dy (referring to the contact signal) of the object on the touch pad 21 and transmit them to the gesture unit 26 and transmitter unit 27. Thus the calculated result Dx and Dy can be transmitted to a host 3 through the transmitter unit 27 so that the host 3 can control the movement of the pointer on the screen. Host 3 can be a personal computer, laptop, personal digital assistant (PDA), or a cellular phone. Hence, the previous mentioned components are not the characteristics of the present invention and commonly known by the people familiar with the art, no further explanation will be illustrated here. Furthermore, the operational module, displacement unit 25, gesture unit 26 and transmitter interface 27 in the preferred embodiment of present invention are all included in a controller such as a chip.

The gesture unit 26 receives the calculation results Dx and Dy from the displacement unit 25 to determine if the object has produced an action qualified as a double tap gesture on the touch pad 21 and also during this determination whether the action is a double tap gesture, correspondingly transmits out the first signal of the simulated double clicking through the transmitter interface to the host 3 in order to carry out the corresponding control. The characteristic technique of the present invention is the method of identifying double tap gesture in the gesture unit 26. The gesture unit 26 can achieve the method of identifying double tap gesture through software, firmware or hardware. Moreover, even though the gesture unit 26 in the example of the present invention is embedded in the controller of the touch device 2, it can be installed in the host 3 as a software or hardware and not just limited to technique used in the preferred embodiment of the present invention.

Besides, even though a capacity type touch device 2 is used as an example in the preferred embodiment of the present invention, persons with knowledge of this convectional art should know that the present invention can be applied onto other types of touch device, such as optical type, resistive type, magnetic type, pressure type, inductance type, surface sonar type, supersonic type and so on. Therefore, it is not confined to just what is illustrated in the preferred embodiment of the present invention.

Figure 3:
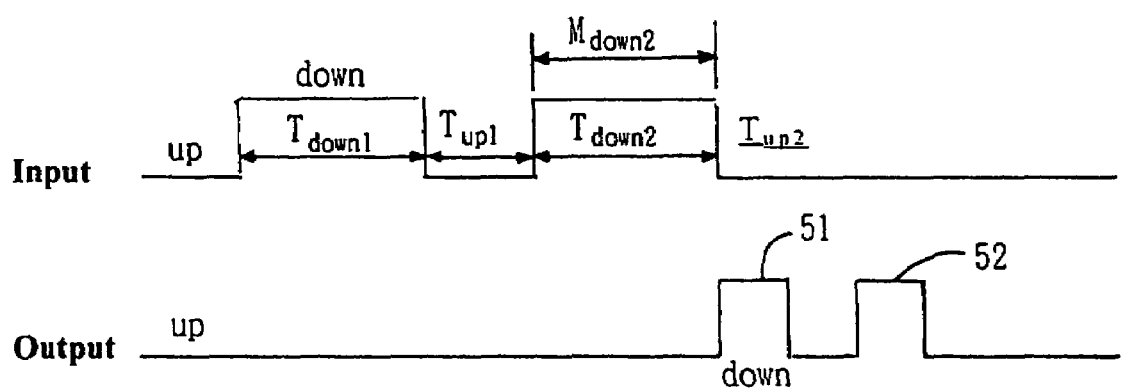
FIG. 3 is diagram illustrating time impulse of an input and an output signal shown in FIG. 2.
Figure 4:
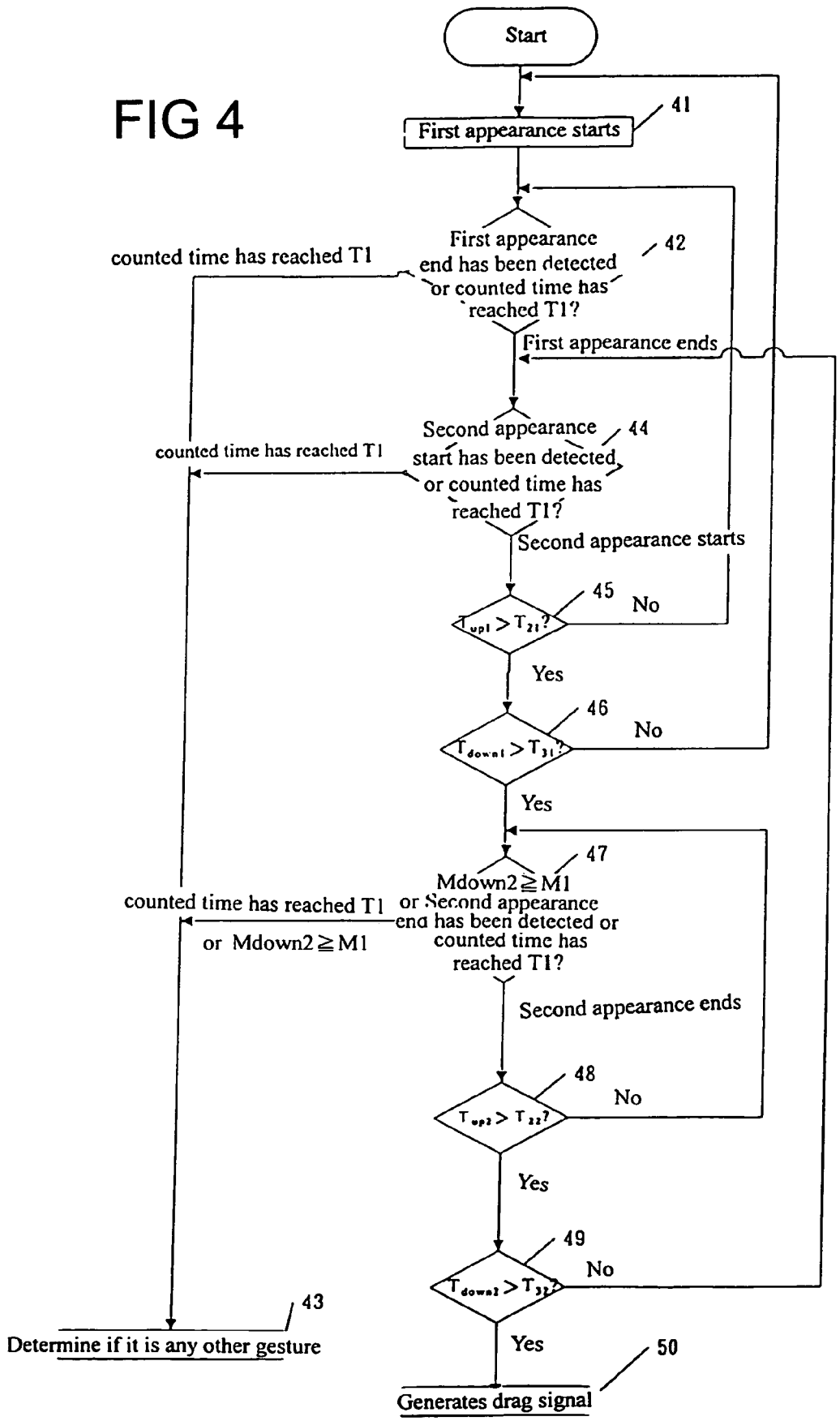
FIG. 4 is a flow chart of the embodiment shown in FIG. 2.

Referring to FIG. 3 and FIG. 4, they illustrate the flow chart of an example in the preferred embodiment of the present invention. In the example, first assume that an object such as a finger 10 has simultaneously tapped on the touch pad 21 twice. To simplify the explanation, in the following paragraphs, the object will be represented by the finger 10. Something worth noting is that even though a finger is used to illustrate the preferred embodiment of the present invention, persons familiar with the conventional art should know that the touch device 2 of the preferred embodiment is suitable for detecting other types of conductive objects or multiple conductive objects, which is not confined to what is revealed in the preferred embodiment of the present invention.

First of all, in step 41, the touch device 2 detects the finger 10 on the touch pad 21 at the start of its first appearance. When the touch device 2 detects the first appearing time duration, gesture unit 26 will start timer immediately.

Subsequently, in step 42, it is to be determined which of the two conditions: the ending of the first appearing time duration or the timer after the first appearing time duration has reached the first reference time $T_1$, has been achieved first. In the present example, assume that within the first reference time $T_1$, the second tap of the double tap gesture should be able to be detected. The range of the first reference time $T_1$ in the present example is between 100 ms and 1000 ms (100 ms <T1<1000 ms), but it can be adjusted according to the need of the designer or the user's operating preference.

If in step 42, it has been determined that the timer has reached the value of first reference time T1, it can be confirmed that it is not a double tap gesture as the first appearing time duration has not finished and the second appearing time duration is not yet detected as well. Thus step 43 will be executed to determine if the action is of any other gestures.

If in step 42, it has been determined that time first appearing time duration has ended and the timer has not reached the first reference time $T_1$, step 44 will be executed.

In step 44, it continues to determine which of the conditions: the start of the second appearing time duration or the timer has reached the first reference time $T_1$, has been achieved first.

Similarly, if in step 44, it has been determined that the timer has reached the value of first reference time $T_1$ first, it can be confirmed that it is not a double tap gesture as the start of the second appearing time duration is not yet detected within the first reference time $T_1$. Thus step 43 will be executed to determine if the action is of any other gestures.

However, if in step 44, it has been determined that the start of the second appearing time duration is detected first, it implies that a double tap gesture may have occurred within the first reference time $T_1$ and step 45 will be continued. Referring to FIG. 3, at the start of the second appearing time duration, the gesture unit 26 from the input signals can obtain the first appearing time duration $T_{down1}$ and the time span between two appearing time duration $T_{up1}$.

Touch pad 21 during its operation can be easily touched by mistake or due to the noise generated by itself or noise from the surrounding environment and then produce inappropriate signals such as short first and second appearing time duration or short time span between the two appearing time duration. As these unwanted signals only last a short period of time, in the following steps 45, 46, 48 and 49 of the preferred embodiment of the present invention, there is a requirement that the time duration of each action must be larger than the respective minimum time value, in order to effectively filter out inappropriate signals and thus enhance the accuracy of the identification.

In step 45, first determine if the time span $T_{up1}$ between the first appearing time duration $T_1$ and the second appearing time duration $T_2$ is larger than the first minimum UP reference time $T_{21}$. The first minimum UP reference time $T_{21}$ is the shortest effective time between the UP and DOWN of the finger 10. The first time span $T_{up1}$ is the time between the tapping of the finger 10 on the touch pad 21 followed by leaving the touch pad 21 and until the second tapping of the finger 10 on the touch pad 21. In the present example, the first minimum UP reference time $T_{21}$ ranges from 1 ms to 10 ms (1 ms$\leq T_{21} \leq$10 ms) and it can be adjusted according to the need of the designer or the operating preference of the user. If step 45 determines the first time span $T_{up1}$ to be larger than the first minimum UP reference time $T_{21}$ ($T_{up1} > T_{21}$), it represents that the signal of the first time span $T_{up1}$ is valid and thus it will continue to step 46. If step 45 determines that the first time span Tup1 is not larger than the first minimum UP reference time $T_{21}$ ($T_{up1} \leq T_{21}$) it implies that the first UP signal has to be considered as noise signal as its time duration is too short, thus the first appearing time duration has not really finished and it will jump back to step 42 to continue detect the finish of the first appearing time duration.

In step 46, determine if the first appearing time duration $T_{down1}$ is larger than the first minimum tap reference time $T_{31}$. Since usually when the finger 10 appeared on the touch pad 21 implies that the finger 10 is down on the touch pad 21, then the shortest effective time the finger 10 first tap on the touch pad 21 and stays on it is called the first minimum tap reference time $T_{31}$. If in step 46, it is determined that the first appearing time duration $T_{down1}$ is larger than the first minimum tap reference time $T_{31}$ ($T_{down1} > T_{31}$), it indicates that the first appearance is a valid signal and step 47 will be continued. However, if step 46 determines the condition to be false ($T_{down1} \leq T_{31}$), which implies that the first appearance is a noise signal and will be discarded, it will jump back to step 41 and resume to wait for the next first appearance.

After the detection of the second appearing time duration, the gesture unit 26 besides resuming the timer, it uses the displacement unit 25 to calculate the accumulated displacement of the second appearing time duration $M_{down2}$. In step 47, determines which of the following three conditions is achieved first: detection of the finish of the second appearing time duration, the accumulated displacement of the second appearing time duration $M_{down2}$ is not less than the reference displacement value $M_1$ or the timer since the first appearing time duration has reached the first reference time $T_1$.

If in step 47, the condition that the second appearing time duration finishes is determined first, it implies that within the first reference time $T_1$, two appearances have really been detected and the accumulated displacement of the second appearing time duration $M_{down2}$ is less than the reference displacement value $M_1$ ($M_{down2} < M_1$). What follows is to verify that in step 48 and 49 respectively, the second appearing time duration has truly finished and the second appearance is a valid signal, and then it will confirm that the two appearances is a double tap gesture.

In step 48, determine if the time span after the second appearing time duration $T_{up2}$ is larger than the second minimum UP reference time $T_{22}$. If step 48 determines that is the time span after the second appearing time $T_{up2}$ is larger than the second minimum UP reference time $T_{22}$ ($T_{up2} > T_{22}$), it implies that the second appearance has truly finished and step 49 will be continued. However, if step 48 determines that the time span after the second appearing time duration $T_{up2}$ is not larger than the second minimum UP reference time $T_{22}$ ($T_{up1} \leq T_{22}$), it implies that the UP during the time span after the second appearing time is noise signal and thus will be discarded and jump back to step 47 to resume waiting for the real UP signal which indicates the finish of the second appearing time duration. In the present example, the second minimum UP reference time $T_{22}$ can be set to be the same as the first minimum UP reference time $T_{21}$.

In step 49, determines if the second appearing time duration $T_{down2}$ is larger than the second minimum tap reference time $T_{32}$. If step 49 determines the second appearing time duration $T_{down2}$ is larger than the second minimum tap reference time $T_{32}$ ($T_{down2} > T_{32}$), thus it indicates the signal of the second appearance is a valid signal. Then, as the summation of the first appearing time duration $T_{down1}$, time span between the two appearing time duration $T_{up1}$ and the second appearing time duration $T_{down2}$ is smaller than the first reference time $T_1$ [($T_{down1} + T_{down2} + T_{up1}) < T_1$] and the accumulated displacement of the second appearing time duration $M_{down2}$ is also smaller than the reference displacement $M_1$ ($M_{down2} < M_1$), step 50 will be executed. However, if step 49 determines that the condition is false ($T_{down2} \leq T_{32}$), the second appearing time duration is too short and will be considered as noise so the signal of the second appearing time will be discarded and jump back to step 44 to wait for the start of the real second appearing time duration. In the present example, the second minimum tap reference time $T_{32}$ can be set to be the same as the first minimum tap reference time $T_{31}$.

In step 50, gesture unit 26 will output a first signal through the transmitter interface 27 into the host 3 to notify the host that a double tap gesture has been produced and simulate the signal produced by double clicking of the mouse button. Referring to FIG. 3, the signal 51 and 52 in the present example will only be sent together after the detection of the second appearance and the double tap gesture is confirmed.

It differs from the convectional method of identifying where the first signal is produced immediately after the first tap.

If in step 47, it is determined first that the accumulated displacement of the second appearing time duration $M_{down2}$ is not less than the reference displacement $M_1$ ($M_{down2} \geq M_1$), it implies that when the finger 10 taps on the touch pad 21 for the second time has not move and thus it could be a tap and drop gesture instead of double tap gesture so it will jump back to step 43 to determine if it is any other gestures. Thus, it will effectively reduce or avoid the chance that the tap and drop gesture is determined as the double tap gesture. The range of the reference displacement $M_1$ in the present example can vary between 1 pixel and 10 pixel (1 pixel $\leq M_1 \leq$ 10 pixel), such as 3 pixel or it can be adjusted according to the need of the designer or the operating preference of the user.

Similarly, if in step 47, it is determined first that the timer since the first appearance has already reached the first reference time T1, it implies that the summation of the first appearing time duration $T_{down1}$, time span between the two appearing time duration $T_{up1}$ and the second appearing time duration $T_{down2}$ is not smaller than the first reference time $T_1$ [$(T_{down1}+T_{down2}+T_{up1}) \geq T_1$], thus the two appearances are not double tap gesture and will jump to step 43 instead to determine if it is of any other gestures.

Summarising the previous claims, the requirement for the double tap gesture in the preferred embodiment of the present invention is defined by the following equations:

$$T_{down1} > T_{31} \quad \text{Eq. 1}$$

$$T_{down2} > T_{32} \quad \text{Eq. 2}$$

$$T_{up1} > T_{21} \quad \text{Eq. 3}$$

$$T_{up1} > T_{22} \quad \text{Eq. 4}$$

$$(T_{down1}+T_{down2}+T_{up1}) < T_1 \quad \text{Eq. 5}$$

$$M_{down2} < M_1 \quad \text{Eq. 6}$$

It should be noted that even the previous mentioned steps 42, 44 and 47 can simultaneously determine multiple conditions. The person familiar with the convectional arts should know that the previous mentioned steps 42, 44 and 47 can also determine the conditions sequentially, so it is not just limited to what has been revealed in the preferred embodiment of the present invention.

It is appreciated that the present invention is different from the convectional method with which the time of each respective step is determined by way of if it is smaller than the respective reference time value and the method of identifying double tap gesture according to the present invention sums up the overall time duration of each action, $T_{down1}$, $T_{down2}$ and $T_{up1}$ and determine if it is not smaller than the first reference time $T_1$ (refer to Eq. 5) so as to achieve a short, effective and reliable determination. Moreover, the present invention further requires that the time duration of each action has to be larger than their respective reference values $T_{31}$ (refer to Eq. 1), $T_{21}$ (refer to Eq. 2) and $T_{22}$ (refer to Eq. 4) so as to effectively filter out the inappropriate signals generated due to disturbance and thus achieve a more accurate determination. In addition, the present invention also requires that the accumulated displacement of the second appearing time duration $M_{down2}$ has to be smaller than reference displacement $M_1$ (refer to Eq. 6), this will differentiate the double tap gesture from the tap and drop gesture and effectively avoid the misjudgement of the tap and drop gesture as the double tap gesture, and further achieve a more accurate determination.

While the invention has been described with reference to the a preferred embodiment thereof, it is to be understood that modifications or variations may be easily made without departing from the spirit of this invention, which is defined by the appended claims.

What is claimed is:

1. A method of identifying double tap gesture with which the double tap gesture is performed on a touch device, comprising follow steps:
   i. Detecting a first appearance of an object on the touch device;
   ii. Detecting a second appearance of the object on the touch device; and
   iii. generating a first signal that represents the first and second appearances in case of the summation of a first appearing time duration, a second appearing time duration and a time span between the two appearing time durations being smaller than a first reference time.

2. The method of identifying double tap gesture as defined in claim 1, wherein the first signal is generated when the accumulated displacement of the second appearing duration is smaller than the reference displacement value.

3. The method of identifying double tap gesture as defined in claim 1, wherein the first signal is generated when the first appearing time duration is larger than the first minimum tap reference time value.

4. The method of identifying double tap gesture as defined in claim 1, wherein the first signal is generated if the second appearing time duration is larger than the second minimum tap reference time value.

5. The method of identifying double tap gesture as defined in claim 1, wherein the first signal is generated when the time span between the ending of the first appearing time duration and the start of the second appearing time duration is larger than the first minimum UP reference time value.

6. The method of identifying double tap gesture as defined in claim 1, 2, 3, 4, or 5 wherein the first signal will be generated when there is no detection of a new appearance within the time after the ending of the second appearance that is at least larger than the second minimum UP reference time value.

7. The method of identifying double tap gesture as defined in claim 1, wherein the first signal is transmitted to a host.

8. A controller of the touch device, with which it is used to identify gesture of an object on the touch device, the controller comprising:
   an operational unit, being used to detect every appearance of the object on the touch device and accordingly producing a respective tap signal, the respective tap signal being generated corresponding to the start of the appearance on the touch device and being terminated when that appearance finishes; and
   a gesture unit, being connected to the operational unit so as to receive the tap signal, calculating the time duration of the object appearing on the touch device based on the tap signal and identifying movement of the object;
   wherein, the gesture unit receives from the operating unit the generated first tap signal and the second tap signal corresponding to the first and second appearance of the object on the touch device respective; the gesture unit also computes the summation of the first appearing time duration, the second appearing time duration and then time span between the two appearing time durations and compares this result with the first reference time; and if the sum is smaller than the first reference time value, then produce the first signal that presents the first and second appearance.

9. The controller of identifying double tap gesture as defined in claim 8, wherein the tap signal generated by the operational unit includes the amount of displacement on the touch device.

10. The controller of identifying double tap gesture as defined in claim 9, wherein the first signal will be generated by the gesture unit when the accumulated displacement of the second appearing time duration computed by the gesture unit is smaller than the reference displacement value.

11. The controller of identifying double tap gesture as defined in claim 8, wherein the first signal will be generated by the gesture unit only when the first appearing time duration is larger than the first minimum tap reference time value.

12. The controller of identifying double tap gesture as defined in claim 8, wherein the first signal will be generated by the gesture unit when the second appearing time duration is larger than the second minimum tap reference time value.

13. The controller of identifying double tap gesture as defined in claim 8, wherein the first signal will be generated by the gesture unit when the time span between finish of the first appearing time duration and the start of the second time duration is larger than the first minimum UP reference time value.

14. The controller of identifying double tap gesture as defined in claim 8, 10, 11, 12 or 13 wherein the first signal will be generated by the gesture unit when there is no detection of a new appearance within the time after the ending of the second appearance that is at least larger than the second minimum UP reference time value.

15. The controller of identifying double tap gesture as defined in claim 8, wherein the controller further includes a transmitter interface that is connected to the gesture unit and transmit the first signal to a host.

16. A gesture unit of the touch device, which is used to identify movement of an object on the touch device, wherein the gesture unit receives from the operating unit the generated first tap signal and the second tap signal corresponding to the first and second appearance of the object on the touch device respective, the gesture unit also computes the summation of the first appearing time duration, the second appearing time duration and then time span between the two appearing time durations and compares this result with the first reference time; and if the sum is smaller than the first reference time value, the first signal that presents the first and second appearance is produced.

17. The gesture unit as defined in claim 16, wherein the first signal is generated when the accumulated displacement of the second appearing time duration is smaller than the reference displacement value.

18. The gesture unit as defined in claim 16, wherein the first signal is generated when the first appearing time duration is larger than the first minimum tap reference time value.

19. The gesture unit as defined in claim 16, wherein the first signal is generated when the second appearing time duration is larger than the second minimum tap reference time value.

20. The gesture unit as defined in claim 16, wherein the first signal is generated when the time span between the finish of the first appearing time duration and the start of the second appearing time duration is larger than the first minimum UP reference time value.

21. The gesture unit as defined in claim 16, 17, 18, 19 or 20 wherein the first signal is generated when there is no detection of a new appearance within the time after the ending of the second appearance that is at least larger than the second minimum UP reference time value.

* * * * *